United States Patent Office 2,895,926
Patented July 21, 1959

2,895,926

PREPARATION OF POLYURETHANE FOAM AND REACTION MIXTURES THEREFOR

George Rappaport, Joseph A. Szaruga, and James R. Wall, Dayton, Ohio, assignors to General Motors Corporation, Detroit, Mich., a corporation of Delaware No Drawing. Application July 14, 1958
Serial No. 748,140

4 Claims. (Cl. 260—2.5)

This invention relates to foam and is particularly directed to foamed products made by reactions involving an isocyanate compound as one of the main reactants.

Foamed reaction products made by reacting polyisocyanates and polyesters have become increasingly important during the last few years and have, in many cases, been substituted for foamed rubber parts. One drawback to polyisocyanate reaction products is the rapidity with which the reaction between the polyisocyanate and the polyester progresses after the mixture is made. In other words, as soon as the various ingredients for the reaction have been mixed, foaming and polymerization progress so rapidly that it is often difficult to dispose the reaction mixture in a suitable mold or molds. Furthermore, due to the rapid reaction it has been difficult in the past to proceed with normal production practices in the intermittent filling of molds, etc.

In copending application S.N. 449,019 assigned to the assignee of the present invention and now abandoned, a method of control is set forth whereby a delay in reaction may be obtained. In this application, the control is accomplished by reduction in the temperature of the ingredients prior to mixing and the storing of the reaction mixture at a temperature in the order of $-10°$ F. and below wherein foaming and polymerization progress as the reaction mixture is warmed up.

It is an object of this invention to provide a method for making a foam wherein initiation of the reaction between the several ingredients is controlled and the complete mixture of the component materials used in the reaction may be accomplished at room temperature and wherein the reaction mixture may then be stored for an appreciable period of time and, finally, at the time desired, the reaction may be initiated through the application of heat.

Another object of the invention is to provide a polyisocyanate-polyester reaction product wherein the catalyst for the polymerization portion of the reaction and the water for the foaming part of the reaction are provided from heat reactive and heat sensitive materials, respectively, whereby the reaction mixture may be fully compounded at room temperature and finally the reaction may be initiated as desired by elevating the temperature of the reaction mixture.

A further object of the invention is to provide ingredients which, upon application of heat, will form a catalyst in situ for use in the polyisocyanate-polyester reaction mixture, together with a heat sensitive water releasing material, whereby a catalyst is not formed until a predetermined elevated temperature is imposed upon the system and wherein the water liberating material does not provide any free water in the mixture until an elevated temperature of predetermined range is reached. In this manner, it is possible to formulate the entire recipe for a reaction mixture and to store said mixture at room temperature without any reaction taking place and wherein predetermined portions of said reaction mixture may be subsequently placed in a mold and may be finally reacted by elevating the temperature to a predetermined temperature whereby the catalyst is formed in situ through the reaction of the catalyst forming ingredients to initiate the polymerization reaction while the water liberating agent releases free water to cause a foaming reaction to take place, said heat reactive and heat sensitive materials, respectively, being made reactive substantially concurrently within an elevated range of temperature.

In carrying out the above objects, it is a further object of the invention to utilize as a catalyst N-phenyl morpholine, this catalyst being formed in situ from the reaction between beta,beta' dichlorodiethylether and aniline, said materials being included as reactants in the original mixture. These catalyst forming ingredients are used in combination with a hydrated salt as a source of water wherein said ingredients and said hydrated salt are heat reactive and heat sensitive, that is to say, they will not react nor liberate water, respectively, to initiate any reaction until a predetermined elevated temperature above room temperature is reached. In this connection, the beta,beta' dichlorodiethylether and aniline, upon being heated to a temperature up to 250° F., react to form N-phenyl morpholine in situ which is a catalyst for the polymerization reaction between an organic diisocyanate, for example, tolylene diisocyanate, and a polyester such as an alkyd resin.

Among the organic polyisocyanates which may be used are: propylene -1,2-diisocyanate, butylene -1,3-diisocyanate, hexylene -1,6-diisocyanate, M-phenylene diisocyanate, 2,4 toluene diisocyanate, 1,6 toluene diisocyanate, 1,5 naphthalene diisocyanate and blends of the above, for example, 80%–20% by weight of 2,4 toluene diisocyanate and 2,6 toluene diisocyanate or a 65%–35% blend by weight of 2,4 and 2,6 toluene diisocyanate, etc.

Useful polyesters which may be incorporated in the reaction include alkyd resins which are defined for the purposes of this invention as the reaction products between polybasic acids and polyhydroxy alcohols, for example, wherein the dibasic acid may be adipic acid, sebacic acid, phthalic acid, malonic acid, succinic acid, maleic acid, etc., and wherein the polyhydroxy alcohol may be ethylene glycol, diethylene glycol, trimethylene glycol, glycerol, sorbitol, propylene glycol, dipropylene glycol, trimethylolethane, trimethylolpropane and mixtures thereof, etc.

A hydrate such as sodium carbonate ($10H_2O$) is preferred as the water releasing agent since this hydrate releases water of hydration within the same temperature range, for example, up to 250° F. The water liberated from the hydrate enters the reaction to cause the foaming of the mixture substantially simultaneously as the polymerization reaction progresses whereby a foam is formed. It is understood that any other suitable hydrate may be used. Sodium potassium carbonate ($6H_2O$), sodium carbonate ($7H_2O$), potassium carbonate ($2H_2O$), etc., are all useful for this purpose. It has been found that the salt contamination caused by the hydrate in the mixture is not deleterious to the final product in any way.

The invention may be specifically illustrated but not limited by the following examples.

*Example 1*

A mixture of 100 parts by weight of a polyester prepared from 16 mols of adipic acid, 16 mols of diethylene glycol, and 1 mol of trimethylol propane and having an acid number of 1.5 maximum and an hydroxyl number of 60 is placed in a tank with 18.2 parts by weight of toluene diisocyanate, 4.5 parts by weight of sodium carbonate ($10H_2O$), 1.4 parts by weight of an emulsifier, 1.4 parts by weight of beta,beta' dichlorodiethylether and .9 by weight of aniline. These ingredients are mixed thoroughly at room temperature in the tank by using a standard paddle type mixer and may then be stored in the mixed condition at room temperature, preferably at about 60° F. plus or minus 10° F. under anhydrous conditions. When it is desired to form a foam product, a desired quantity of this reaction mixture is placed in a mold having the desired shape and size and the mold is heated to a temperature of about 250 °F. and maintained at said temperature for a period in the order of 30 minutes. During this time, the beta,beta' dichlorodiethylether and aniline react to form 3 parts by weight of N-phenyl morpholine which is the active catalyst while the hydrated sodium carbonate releases water to initiate the foaming reaction. At the end of the heating period, a flexible foam having the desired shape is present in the mold and may be removed therefrom.

*Example 2*

A mixture of 100 parts by weight of a polyester prepared from 8 mols of sebacic acid, 8 mols of adipic acid, and one-half mol of trimethylol propane having an acid number of 5 maximum and an hydroxyl number of from 60 to 80 is charged into a tank and is mixed at room temperature with 25 parts by weight of toluene diisocyanate, 8 parts by weight of sodium carbonate ($10H_2O$), suitable quantities of aniline and beta,beta' dichlorodiethylether to subsequently form 7 parts by weight of N-phenyl morpholine (about 2.1 parts and 3.36 parts respectively) and 2 parts by weight of an emulsifier. This mixture may be stored at room temperature, preferably 60° F. plus or minus 10° F. under anhydrous conditions. When it is desired to form a foam product, suitable quantities of this mixture are reacted in a mold at temperatures of 250° F. as set forth in connection with Example 1 to form a flexible foam.

*Example 3*

A mixture of 100 parts by weight of a polyester prepared from 8 mols of adipic acid, 8 mols of sebacic acid, 16 mols of ethylene glycol and 1 mol of trimethylol propane having an acid number of 3 maximum and an hydroxyl number of from 60 to 69, is charged into a tank together with 16 parts by weight of a diisocyanate blend made up of 80% by weight of 2,4 toluene diisocyanate and 20% by weight of 2,6 toluene diisocyanate, sufficient quantities of aniline and beta,beta' dichlorodiethylether to subsequently form 3 parts by weight of N-phenyl morpholine (.9 and 1.4 parts respectively), 6 parts of sodium potassium carbonate ($6H_2O$), and 1 part of an emulsifier are thoroughly mixed at room temperature with a standard paddle type mixer and may then be stored in mixed condition at room temperature, preferably 60° F. plus or minus 10° F. under anhydrous conditions. When it is desired to form a flexible foam product from this mixture, a desired quantity is charged into a mold and is heated as set forth in connection with Example 1 to form a flexible foam having the desired shape.

In all of the foregoing examples, the emulsifier used was an ethylene oxide condensation product of stearic acid. Other emulsifiers of this same general class, such as those derived from lauric or palmitic acid, are also useful as well as commercial emulsifiers such as alkylaryl sulfonates or dioctylsulfosodium succinate, etc.

It is apparent that, in all of the foregoing examples, the mold may be initially heated prior to the introduction of the reaction mixture therein and that, in most cases, this will reduce the period of heating. However, this alternative is entirely a matter of choice.

In all instances, the preparation of the polyester is carried out by reacting the specific ingredients such as the polybasic acid and the polyhydroxy alcohol by placing the ingredients in the proportions set forth in an open kettle and reacting the ingredients at temperatures above 212° F., preferably about 220° F., whereby the water reaction may be eliminated, as desired. The processing is controlled to yield acid and hydroxyl numbers within the ranges noted as is well known in the art. Of course, other conventional preparatory processes for making the polyesters may be used, if desired, although the foregoing is one of the most simple ways of preparing the polyester from its starting ingredients.

In concurrently filed application S.N. 748,142, we have disclosed an alternative method for controlling the reaction of the specific ingredients. In our concurrently filed application, the catalyst is N-ethyl, methyl or phenyl morpholine hydrochloride which is substantially inactive at room temperatures and which, upon heating, becomes active as the catalyst.

While the embodiments of the present invention as herein disclosed constitute preferred forms, it is to be understood that other forms might be adopted.

What is claimed is as follows:
1. In a method for producing foamed products through substantially concurrent polymerization and foaming reactions between an organic polyisocyanate and a polyester, comprising the steps of; mixing from 16 to 25 parts by weight of an organic diisocyanate with 100 parts by weight of a polyester which is a reaction product of a polyhydric alcohol and a dicarboxylic acid having an acid number between 1.5 and 5 and an hydroxyl number of from 60 to 80 together with calculated quantities of beta,beta' dichlorodiethylether and aniline sufficient to subsequently form between 3 and 7 parts by weight of N-phenyl morpholine together with from 4 to 8 parts by weight of a hydrated alkali metal carbonate to supply water for the foaming reaction, subsequently heating the mixture to a temperature above room temperature and not in excess of 250° F. to form the N-phenyl morpholine in situ and thereby initiate the polymerization reaction between the diisocyanate and the polyester and substantially concurrently cause the hydrated alkali metal carbonate to release its water of hydration for causing the foaming reaction to take place.

2. In a method for producing foamed products through substantially concurrent polymerization and foaming reactions between toluene diisocyanate and a polyester, comprising the steps of; mixing 16 to 25 parts by weight of toluene diisocyanate and 100 parts by weight of a polyester which is a reaction product of a polyhydric alcohol and a dicarboxylic acid having an acid number of 1.5 to 5 and an hydroxyl number of from 60 to 80 with calculated quantities of beta,beta' dichlorodiethylether and aniline sufficient to subsequently form between 3 and 7 parts by weight of N-phenyl morpholine in situ within the mixture together with 4 to 8 parts by weight of $Na_2CO_3 \cdot 10H_2O$, then heating the mixture to a temperature above room temperature and not in excess of 250° F. for producing N-phenyl morpholine in situ through the reaction of the beta,beta' dichlorodiethylether and the aniline for initiating a polymerization reaction between the diisocyanate and the polyester and substantially concurrently causing the $Na_2CO_3 \cdot 10H_2O$ to release water of hydration for causing the foaming reaction to take place.

3. In a method for producing foamed products through substantially concurrent polymerization and foaming reactions between an organic polyisocyanate and a polyester, comprising the steps of; mixing an organic polyisocyanate having an acid number of between 1.5 and 5 and an hydroxyl number of between 60 and 80 with a polyester which is a reaction product of a polyhydric alcohol and a dicarboxylic acid in quantities to subsequently form between 116 and 125 parts by weight of the mixture, adding to this mixture catalyst forming ingredients consisting of from .9 to 2.1 parts by weight of aniline and 1.4 to 3.36 parts by weight of beta,beta' dichlorodiethylether and from 4 to 8 parts by weight of an hydrated alkali metal carbonate, mixing the ingredients at room temperature, then storing the mixture under anhydrous conditions at temperatures of from 50° F. to 70° F., and finally initiating a reaction in said mixture by heating the mixture in a mold to a temperature of about 250° F. whereby the aniline and beta,beta' dichlorodiethylether react to form an active catalyst for initiating a polymerization reaction between the polyester and the organic polyisocyanate and substantially simultaneously causing water to be released from the alkali metal carbonate in sufficient quantities to initiate a foaming reaction whereby a flexible foam of the desired shape is produced in the mold.

4. A reaction mixture for subsequent use in the production of foamed polymerization products, said reaction mixture being substantially nonreactive at room temperatures and comprising 16 to 25 parts by weight of an organic polyisocyanate and 100 parts by weight of a polyester which is a reaction product of a polyhydric alcohol and a dicarboxylic acid having an acid number not in excess of 5 and an hydroxyl number not less than 60 as the essential ingredients, together with 4 to 8 parts by weight of a hydrated alkali metal carbonate and with sufficient aniline and beta,beta' dichlorodiethylether to subsequently form between 3 and 7 parts by weight of N-phenyl morpholine from the chemical inter-action of the aniline and the beta,beta' dichlorodiethylether when the temperature is above room temperature.

No references cited.